[11] 3,602,576

| [72] | Inventors | H.<br>W<br>Billy M. Horton, Kensington, Md.; Charles H. Klute, Washington, D.C.; Donald R. Hartter, Silver Spring, Md. |
|---|---|---|
| [21] | Appl. No. | 457,545 |
| [22] | Filed | May 20, 1965 |
| [45] | Patented | Aug. 31, 1971 |
| [73] | Assignee | The United States of America as represented by the Secretary of the Army |

[54] OPTICAL VIEWING SYSTEM
8 Claims, 3 Drawing Figs.

[52] U.S. Cl....................................................... 350/160 R, 350/52
[51] Int. Cl.................................................... G02b 23/08
[50] Field of Search............................................ 350/160, 52; 88/1

References Cited
UNITED STATES PATENTS

| 3,273,458 | 9/1966 | Kohler.......................... | 88/1-X |
| 3,301,634 | 1/1967 | Morriss........................ | 350/52 |

*Primary Examiner*—Rodney D. Bennett, Jr.
*Assistant Examiner*—Daniel C. Kaufman
*Attorneys*—Harry M. Saragovitz, Edward J. Kelly and Herbert Berl

ABSTRACT: An optical viewing system employing a photochemical shutter for protecting an observer against the harmful and binding effects of intense light produced by laser beams. The incoming light is split into two beams, one of which is delayed in reaching the photochemical shutter which acts as a reflector. When an intense light pulse is received the nondelayed beam will cause the photochemical shutter to decompose explosively thus disrupting the transmission of the delayed beam of light.

INVENTORS,
HANS W. KOHLER
BILLY M. HORTON
CHARLES H. KLUTE
DONALD R. HARTTER

OPTICAL VIEWING SYSTEM

The invention described herein may be manufactured and used by or for the Government of the United States of America for governmental purposes without the payment to us of any royalty thereon.

This invention relates to eye protection against intense light, and more particularly to an optical viewing system employing a photochemical shutter for protecting an observer against the harmful and blinding effects of intense light that is produced by laser beams or other sources.

The optical maser or laser is a relatively recent development which promises to have many useful applications. Already, considerable effort is being directed toward the development of communications systems using lasers. In this connection, the U.S. Army Electronics Command Laboratories at Fort Monmouth, N.J., has recently demonstrated the use of a laser light beam to relay simultaneously the signals received from all seven of the television channels broadcast from New York's Empire State Building. A report of this demonstration may be found on page 3 of *Army Research and Development*, Mar. 1965. Hyperaccurate range finders employing laser beams are also being developed, and, while the output power of presently available lasers is insufficient for use as "death rays," the use of lasers as military weapons has been widely suggested. See for example "Laser Weapons" by Bernard Kovit in the Oct. 1963 issue of *Space/Aeronautics* pages 76 to 81. With these potential applications of lasers, there is a need for effective protection of military personnel against the harmful effects of these devices to their vision. Particularly vulnerable to eye damage are military observers such as tank drivers, artillery battery commanders, and others who, for the successful performance of their jobs, must use powerful optical telescopes, periscopes, and the like to make visual observations of an area where intense light radiation might originate.

It is therefore an object of this invention to provide an optical viewing system which will protect an observer against the adverse effects of intense light such as that produced by laser beams.

It is another object of the instant invention to provide a viewing system for protecting the eyesight of an observer against the harmful effects of intense light and at the same time warn the observer of the proximity of intense light.

It is a further object of the invention to provide optical viewing system which is simple and may be fabricated in the form of conventional viewing in sighting devices and which is effective to protect an observer against intense light.

According to the present invention, these and other objects are attained by providing an optical viewing system in which the incoming light is split optically into two parts which may be termed the "see beam" and the "burn beam." The "see beam" is delayed relative to the "burn beam" to a photochemical shutter. The photochemical shutter performs the function of a mirror in the "see beam" path during normal operation. When laser pulse is received, the "burn beam" causes the photochemical shutter to decompose explosively thus disrupting the transmission of the "see beam" to the observer's eyes.

The specific nature of the invention, as well as other objects, aspects, uses and advantages thereof, will clearly appear from the following description from the accompanying drawing in which.

Figure 1:
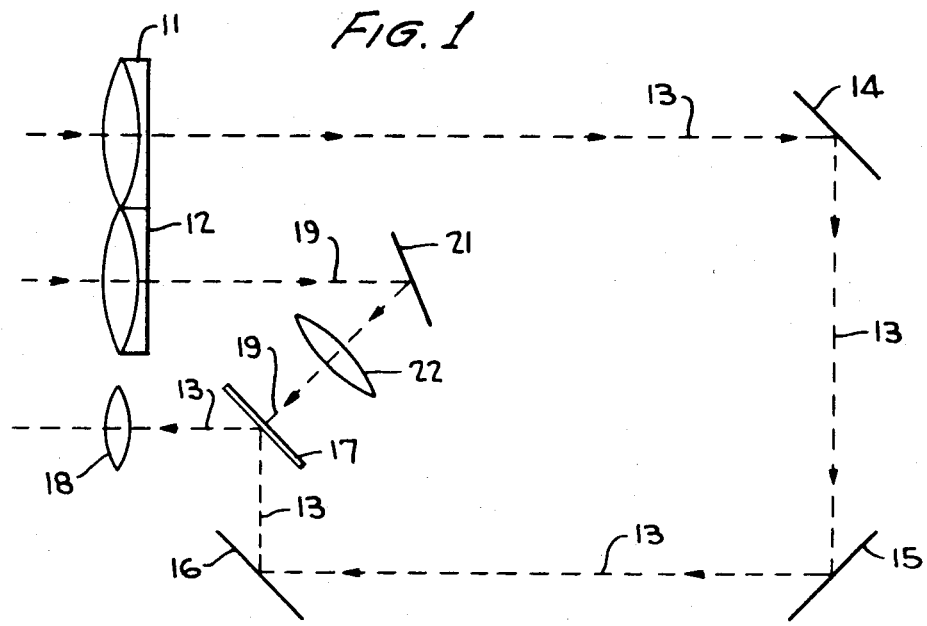
FIG. 1 is a schematic diagram illustrating the general form of the optical viewing system.

Referring now to the drawing and more particularly to FIG. 1, an optical viewing system according to the present invention is illustrated as having two objective lenses 11 and 12. Objective lens 11 is the viewing lens, while objective lens 12 is the shutter-lens. For binocular viewing, it is necessary to provide two viewing lenses instead of the one illustrated. Only one shutter lens need be provided whether viewing is monocular or binocular. The light gathered by objective lens 11 and represented by the dotted line 13 is termed the "see beam." This light follows a circuitous path via mirrors 14, 15, and 16 to the photochemical shutter 17 and thence eyepiece 18. The light gathered by objective lens 12 and represented by the dotted line 19 is termed the "burn beam." This light follows a direct path by way of mirror 21 and converging lens 22 to the photochemical shutter 17. Thus, it is apparent that the arrival of the "see beam" 13 at the photochemical shutter 17 is delayed in time with respect to the arrival of the "burn beam" 19. There are alternative structures to that illustrated in FIG. 1 which optically split the incoming light into two parts and delay one part with respect to the other. U.S. Pat. application Ser. No. 400,304, now U.S. Pat. No. 3,273,458 filed Sept. 28, 1964, by Hans W. Kohler, and assigned to the assignee of the instant application, describes structure which is readily adapted to the viewing system of this invention. For example, instead of providing two objective lenses, one for the "see beam" and one for the "burn beam," a single objective lens and a beam splitter may be used. The obvious advantage to this structure is that it is compact, light, and relatively inexpensive. These advantages are, however, achieved with the attendant disadvantage of an attenuated transmission of the received light. An alternative light delay path for the "see beam" might be provided with light pipes thereby eliminating the mirrors 14, 15 and 16 and their alignment problems.

Figure 2:
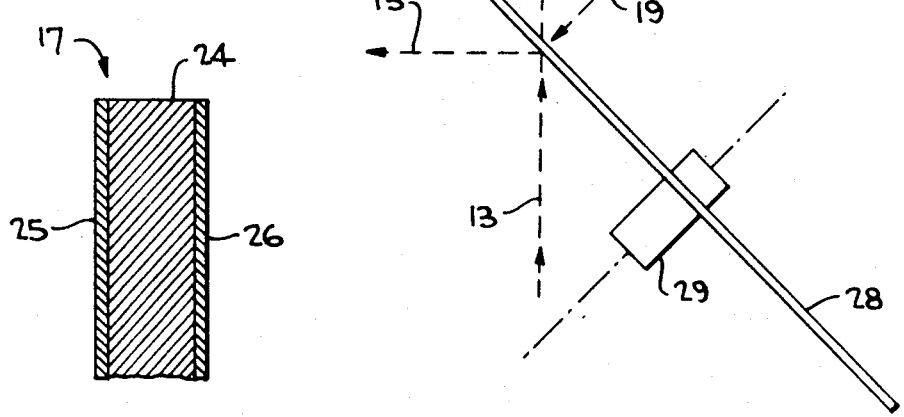
FIG. 2 is a partial cross-sectional view of the photochemical shutter showing its composition.

The photochemical shutter 17 is shown in more detail in FIG. 2 of the drawing. This figure is a greatly enlarged cross-sectional view showing the photochemical shutter as consisting of a thin film of optically absorbent explosive 24 to one side of which is cohesively bonded a thin metallic film 25. The metallic film 25 thus provides a mirrored surface for the explosive film 24. In the viewing system shown in FIG. 1, the "see beam" is reflected by this mirrored surface toward the eyepiece 18 while the "burn beam" is directed against the opposite surface of the shutter 17. When the intensity of the light in the "burn beam" focused on the photochemical shutter 17 increases due to the presence of a laser beam, the shutter decomposes rapidly. No damage results to the other parts of the optical viewing system because of the small amount of flammable material present. When the "see beam" arrives at the spot where the shutter was, it will no longer be reflected toward the eyepiece 18, but, rather, will be harmlessly absorbed within the viewing system housing. The thin explosive material 24 may be one of several compositions depending on the sensitivity desired. Examples of suitable compositions are nitrocellulose, lead azide, PETN, lead styphnate, and silver nitride. The last composition, silver nitride, must be desensitized by the addition of a resin or other suitable binder because of its highly sensitive qualities. The thickness of the film is on the order of 10 microns. The thin metallic film 25 may be vacuum deposited to a thickness on the order of hundreds of angstroms, and may be, for example, aluminum. To further enhance the absorptive qualities of the photochemical shutter 17, a specially highly absorbent film 26 may be deposited on the exposed surface of explosive film 24. Alternatively, the binder material of the explosive film 24 may be chosen for its light absorbing qualities. While it is desirable to have a shutter that is sensitive to a very broad spectrum of radiation, it is only necessary that it be sensitive in the visible region. Suitable infrared and ultraviolet filters may be incorporated in the eyepiece 18 to protect the observer's eyes against laser beams in these regions of the spectrum.

Figure 3:
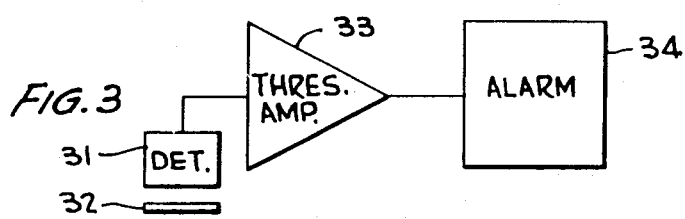
FIG. 3 is a partial schematic and a partial block diagram illustrating a renewable photochemical shutter and one technique for detecting the decomposition of the shutter.

Obviously, once the shutter has decomposed, the viewing system is no longer operable. It is necessary to make the shutter renewable in order that the function of the observer is not lost. One way to accomplish this is illustrated in FIG. 3. Here, a large apertured disk 28 is rotatably mounted on a shaft 29. The disk 28 supports within each of its apertures a separate photochemical shutter and is positioned within the viewing system to provide the required reflection of the "see beam" 13 and interception of the "burn beam" 19. Upon the decomposition of one photochemical shutter, a new shutter may then be moved into place by rotating the disk 28. Alternatively, an apertured carrier in the form of a long, thin, flexible roll may be provided. As in the case of the disk, the roll supports within each of its apertures a separate shutter. The roll itself is supported in a carrier much like the film carrier in a photographic camera. It is simply a matter of "advancing the film" to renew the photochemical shutter.

The decomposition of the shutter provides a simple means for indicating that a laser beam has been received and permits checking whether a laser beam is still being received. As shown in FIG. 3, when the photochemical shutter is decomposed by the "burn beam" 19, the "see beam" 13 passes through the empty aperture in disk 28 and impinges on a suitable photoelectric detector 31. A filter 32 may be interposed between the detector 31 and the "see beam" 13 as required by the characteristics of the particular detector selected. The output of detector 31 is connected to a threshold amplifier 33. The amplifier 33 provides an output signal to an alarm device 34 when the signal from detector 31 exceeds some predetermined level. An alternative arrangement could employ an auxiliary light source in combination with a photoelectric detector to check the presence or absence of a photochemical shutter in the apertured disk.

It will be apparent that the embodiments shown are only exemplary and that various modifications can be made in construction and arrangement within the scope of the invention as defined in the appended claims.

We claim as our invention:

1. An optical viewing system for protecting an observer against the harmful and blinding effects of intense light that is produced by laser beams comprising:
    a. beam splitting means for dividing incoming light into first and second light beams;
    b. an eyepiece for viewing the light image of said first light beam;
    c. a photochemical shutter means for directing said first light beam toward said eyepiece;
    d. means for directing said second light beam onto said photochemical shutter means, said photochemical shutter rapidly decomposing when the intensity of said second light beam exceeds a predetermined level; and
    e. delay means for delaying said first light beam with respect to said second light beam to said photochemical shutter.

2. An optical viewing system as recited in claim 1 wherein said photochemical shutter means compromises:
    a. a thin film of light absorbing explosive material; and
    b. a thin film of optically reflecting material cohesively bonded to one side of said thin film of explosive material to form a mirrored surface, said photochemical shutter being positioned in said viewing system to have said mirrored surface direct said first light beam toward said eyepiece and to have said second light beam projected onto the exposed surface of said thin film of explosive material.

3. An optical viewing system as recited in claim 2 wherein said thin film of explosive material is composed of a composition selected from the group consisting of nitrocellulose, lead azide, PETN, lead styphnate, and silver nitride.

4. An optical viewing system as recited in claim 2 wherein said thin film of optically reflecting material is composed of aluminum.

5. An optical viewing system as recited in claim 1 further comprising means for renewing said photochemical shutter means after the intensity of said second light beam has caused the rapid decomposition of said photochemical shutter means.

6. An optical viewing system as recited in claim 5 wherein said means for renewing said photochemical shutter means comprises an apertured disk rotatably mounted in said viewing system and supporting within each of its apertures a separate photochemical shutter, said disk being positioned in said viewing system to permit moving a new photochemical shutter into operative position after the decomposition of a preceding photochemical shutter.

7. An optical viewing system as recited in claim 1 further comprising means for detecting the decomposition of said photochemical shutter means and providing a warning to an observer using said viewing system.

8. An optical viewing system as recited in claim 7 wherein said means for detecting the decomposition of said photochemical shutter means comprises:
    a. a photoelectric detector positioned within said viewing system to receive said first light beam after the decomposition of said photochemical shutter means; and
    b. means connected to said photoelectric detector means for producing an alarm when said photoelectric detector receives as first light beam.